United States Patent [19]

Stöhr

[11] Patent Number: 4,885,908
[45] Date of Patent: Dec. 12, 1989

[54] ENERGY-CONDUCTING CHAIN MADE FROM PLASTICS MATERIAL

[76] Inventor: Albert Stöhr, Am Wiegenberg 8, 8015 Markt Schwaben, Fed. Rep. of Germany

[21] Appl. No.: 222,065

[22] Filed: Jul. 8, 1988

[30] Foreign Application Priority Data

Jul. 15, 1987 [DE] Fed. Rep. of Germany ....... 3723362

[51] Int. Cl.⁴ ............................................. F16G 13/16
[52] U.S. Cl. ...................................... 59/78.1; 59/900; 248/49
[58] Field of Search .................... 59/78.1, 900; 248/50, 248/49, 51, 62

[56] References Cited

U.S. PATENT DOCUMENTS 4,570,437 2/1986 Moritz .................................. 59/78.1
4,590,961 5/1986 Schumann ........................... 59/78.1

FOREIGN PATENT DOCUMENTS 3408912 8/1985 Fed. Rep. of Germany ....... 59/78.1
8513491.0 8/1985 Fed. Rep. of Germany .
3619049 2/1987 Fed. Rep. of Germany ....... 59/78.1

OTHER PUBLICATIONS

"Murrplastik", Plastic Support Chain for Cables and Conduit SR3000 Printed 1/1985 p. 5212.
"Murrplastik" Plastic Support Chain, MP4000/MP6000, 1986, p. 5202.
"Hennig Nylotrak" Cable Carriers Printed 11/1986, p. 4.

Primary Examiner—David Jones
Attorney, Agent, or Firm—Thomas & Kennedy

[57] ABSTRACT

The invention relates to an energy-conducting chain made from plastics material, in which the cross-pieces contain conical extensions and sprung stop tongues, in which the stop engagement can be released in a simple manner by means of a screwdriver and the individual elements can be reliably protected against damage caused by clumsy handling.

11 Claims, 5 Drawing Sheets

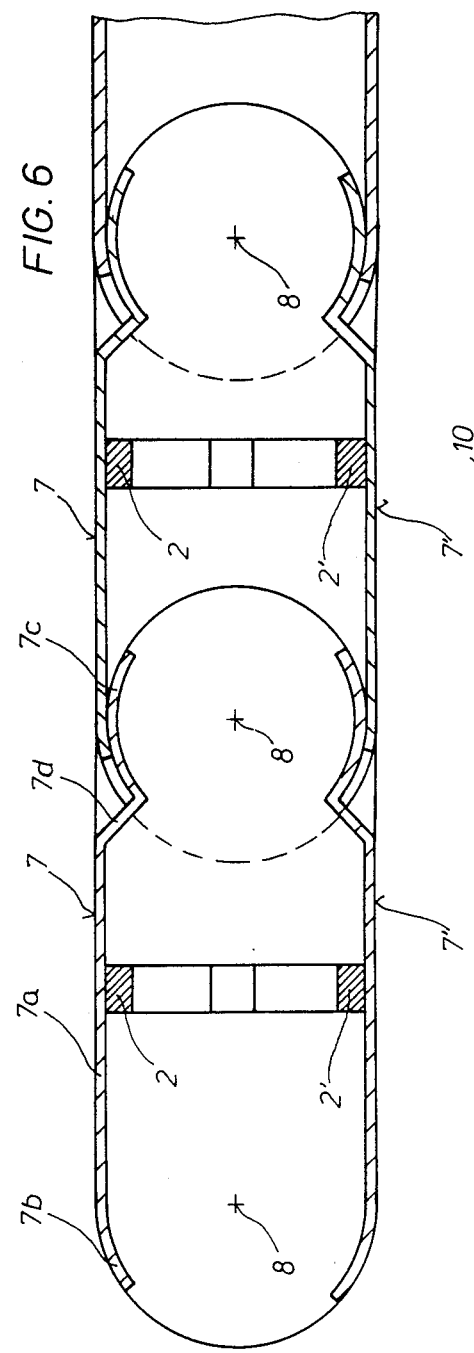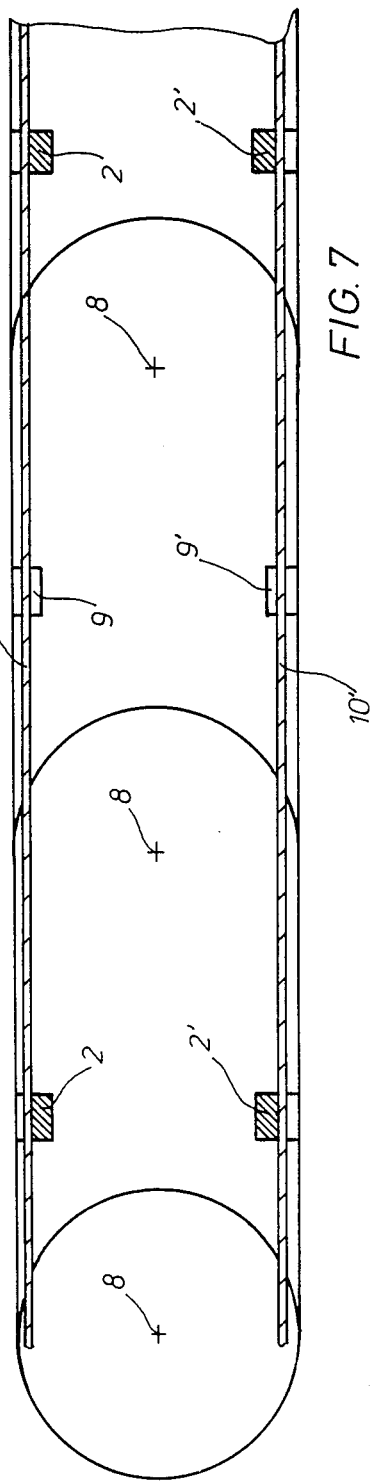

4,885,908

ENERGY-CONDUCTING CHAIN MADE FROM PLASTICS MATERIAL

BACKGROUND OF THE INVENTION

The invention relates to an chain for receiving an electrical conducting cable or other energy conductor.

Chains for housing electrical conducting cables and other conductors, referred to as enery-conducting chains are known from DE-OS 36 19 049 in which the individual chain links contain a U-shaped frame which serves to receive the energy-conducting leads. The chain links are closed on their upper surface by a releasable cross-piece. The cross-piece is provided at both ends with sprung stop elements which come into releasable engagement with the side walls of the frame.

A disadvantage of this construction is that separate frames have to be produced for chain links of different widths, which involves high tooling costs for integral production of these frames. With this known construction there is also the danger that the sprung stop elements can be damaged or even broken off by clumsy handling.

An energy-conducting chain is also known from DE-GM 85 13 491 in which the individual chain links each consists of side plates at two cross-pieces which connect them. Such a construction makes it possible to produce chain links of different widths using fewer basic elements.

In this known construction the cross-pieces have on both ends studs which are of T-shaped cross-section, engage in corresponding sockets in the side plates and are provided on their outer surface with sprung stop tongues which extend from the end of the stud part to the attachment point. The stop connection is released by means of a tool which is introduced from the outside of the side plate or from the upper or lower side of the cross-piece through a slot.

A disadvantage of this known construction is, above all, that releasing the stop connection requires an awkward manipulation and there is a danger of damage to the sprung stop tongues. The known construction also has at the ends of the cross-pieces, in the region of the stop tongues, relatively large recesses which are open towards the exterior and in which dirt and foreign bodies (e.g. chippings) can settle, which considerably impairs the release of the stop connection in some circumstances.

SUMMARY OF THE INVENTION

The object of the invention, therefore, is to construct an energy-conducting chain according to the preamble to claim 1 in such a way that the cross-pieces can be released in a particular simple manner and the sensitive parts of the stop connection are protected against damage even in the even of clumsy handling.

BRIEF DESCRIPTION OF THE DRAWINGS

One embodiment of the invention is illustrated in the drawings, in which:

FIGS. 6 and 7 show longitudinal sections through two variants of the chain.

DETAILED DESCRIPTION

Figure 1:
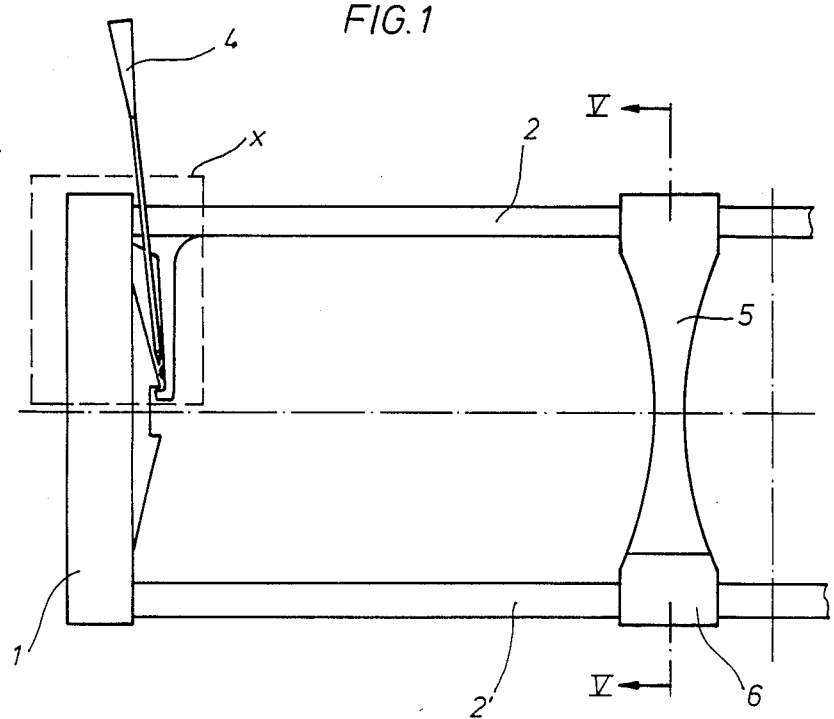
FIG. 1 shows a partial view, which has been kept quite schematic, of a link of the energy-conducting chain according to the invention.
Figure 2:
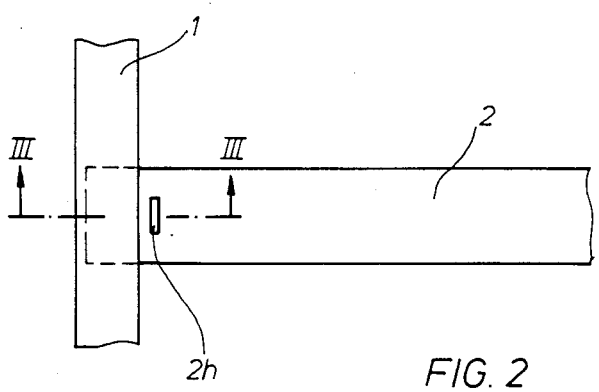
FIG. 2 shows a plan view of the chain link according to FIG. 1.

The energy-conducting chain made from plastics material which is only illustrated quite schematically in FIGS. 1 and 2 contains two lateral side plate chains of which only one side plate 1 of the left-hand side plate chain is indicated in FIGS. 1 and 2. The individual side plates of the side plate chain are pivotably connected to one another in a known manner and their pivoting movement is defined by stops.

Upper and lower cross-pieces 2, 2' are arranged in pairs at intervals between the side plate chains. They each connect a right-hand and a left-hand side plate 1 to a rigid frame, in the interior of which energy-conducting leads (which are not illustrated in the drawing) are accommodated, and separators can be arranged between the cross-pieces 2, 2' to define the individual cable spaces.

Figure 3:
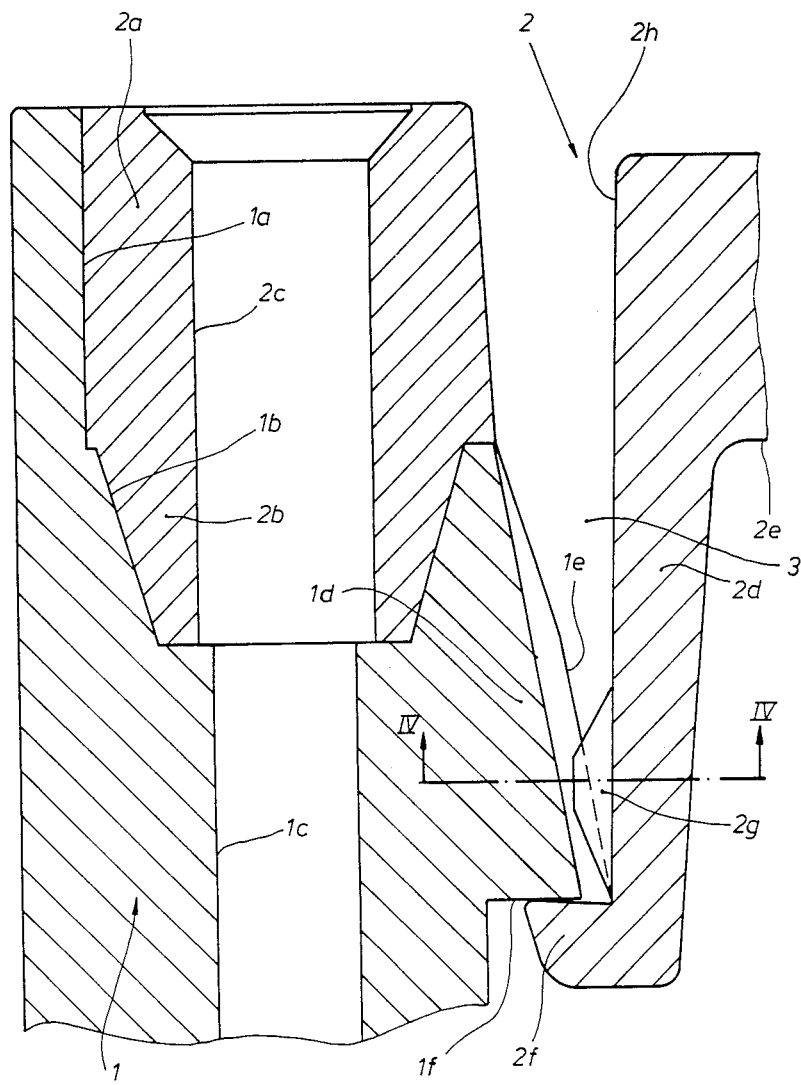
FIG. 3 shows a section along the line III—III of FIG. 2 (details x according to FIG. 1).
Figure 4:
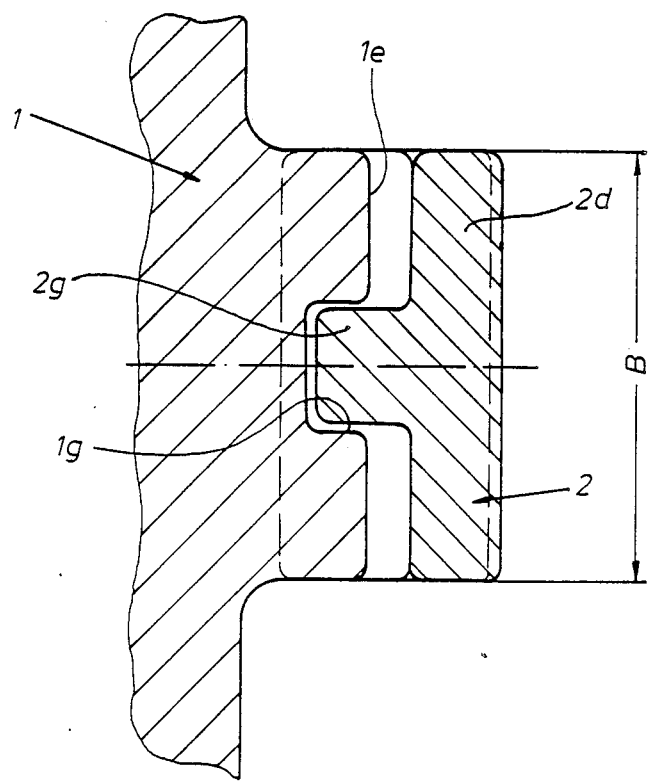
FIG. 4 shows a section along the line IV—IV of FIG. 3.

The connection of the cross-pieces and said plates according to the invention is illustrated in detail in FIGS. 3 and 4. Since all connection points are of identical construction, the description below of the connection of the cross-piece 2 to the side plate 1 will be sufficient.

The cross-piece 2 engages in a form-locking manner with its end 2a in a rectangular recess 1a which is open towards the cross-piece. A conical extension 2b which engages in a corresponding conical recess 1b in the side plate 1 is provided on the underside of the end 2a of the cross-piece 2.

The end 2a of the cross-piece 2 is provided with an opening 2c to which the opening 1c in the side plate 1 is connected. These openings 1c, 2c can serve to receive a screw by means of which the cross-piece can be screwed to the side plate 1 (in addition to the stop connection described below).

A stop tongue 2d is also constructed integrally with the cross-piece 2 and is arranged spaced from the extension 2b in such a way that its root is attached to the inner surface 2e of the cross-piece 2.

The stop tongue 2d has on its end a stop projection 2f which points towards the side plate 1 and is also provided with a guide projection 2g on its outer surface near the stop projection 2f.

As can be seen from FIG. 4, the guide projection 2g only extends over a port of the width B of the stop tongue 2d (measured in the axial direction of the energy-conducting chain).

The space 3 between the side plate 1 and the cross-piece 2 is defined on the side plate side by a stop projection 1d which is formed by an inclined guide surface 1e and a stop surface 1f.

The inclined guide surface 1e of the side plate 1 is provided with a groove 1g which serves to receive the guide projection 2g of the stop tongue 2d (cf. FIG. 4).

The free length of the stop tongue 2d is substantially greater than the free length of the conical extension 2f. As can be seen from FIG. 1, the free length of the stop tongue 2d is only slightly less than half of the internal distance between the two cross-pieces 2, 2'. In this way the sprung stop tongues 2d have an excellent springiness, even with a stable construction.

In the region between the extension 2b and the stop tongue 2d the cross-piece 2 is provided with an opening 2h through which a screwdriver 4 (only indicated schematically in FIG. 1) can be inserted to a predetermined depth (defined by the dimensions of the opening 2h) into the space 3 between the stop tongue 2d and the stop projection 1d.

In the position illustrated in the drawing, the stop projection 2f of the stop tongue 2d is in engagement with the stop surface 1f of the stop projection 1d of the side plate 1. In this way the cross-piece 2 and the side plate 1 are firmly connected to one another, and the conical extension 2b of the cross-piece 2 is firmly pressed into the conical recess 1b.

If the screwdriver 4 is now introduced through the opening 2h into the space 3 (advantageously one screwdriver can be used in the region of each end of the cross-piece), then the blade of the screwdriver contacts the inclined guide surface 1e of the side plate 1 and then the guide projection 2g of the stop tongue 2d. When the screwdriver 4 is pushed in further the stop tongue 2d is pivoted over the guide projection 2g (towards the right in FIG. 3) to such an extent that the stop projection 2f comes free from the stop surface 1f of the stop projection 1d. The stop tongue 2d, which is somewhat deformed elastically in the longitudinal direction in the engaged position, is at this moment relieved of springing so that the conical extension 2b is lifted from the recess 1b and the cross-piece 2 moves slightly upwards. If the screwdriver 4 is now withdrawn from the space 3, the stop projection 2f of the stop tongue 2d cannot come back into engagement with the stop surface 1f but rests on the lower end of the inclined guide surface 1e. The unlocked position is therefore maintained whilst the screwdriver is being withdrawn. Then the cross-piece can be easily removed upwards.

When the cross-piece 2 is placed on the side plate 1 (for the purpose of producing the connection), secure achievement of the locked position is ensured on the one hand by the conical extension 2b (in co-operation with the conical recess 1b in the side plate 1) and on the other hand by the guide projection 2g of the stop tongue 2d (in co-operation with the groove 1g of the guide surface 1e). In the last part of this insertion operation the cross-piece 2 is elastically deformed to such an extent that when the stop projection 2f snaps in behind the stop surface 1f the conical extension 2b is pushed with strong axial pressure onto its seat (recess 1b). In this way an absolutely rigid, torsion-free connection between the side plate 1 and the cross-piece 2 is ensured in the locked position.

In the construction according to the invention the sprung stop tongues 2d are reliably protected against damage by clumsy handling. Since the screwdriver can only be inserted to a predetermined depth into the space 3 it is not possible for an unacceptablly great strain, leading to damage, to be exerted on the stop tongues 2d. It is particularly advantageous in this connection that the unlocking of the stop connection only requires a simple insertion movement of the screwdriver in a straight line, not a pivoting or tilting movement which could easily lead to damage of the sprung stop tongues if not handled properly.

The space 3 between the side plate 1 and the sprung stop tongue 2d is closed towards the exterior as far as the relatively small opening 2h. In this way the danger of disruption caused by dirt entering ths space 3, particularly the penetration of larger chippings, is reliably excluded.

Figure 5:
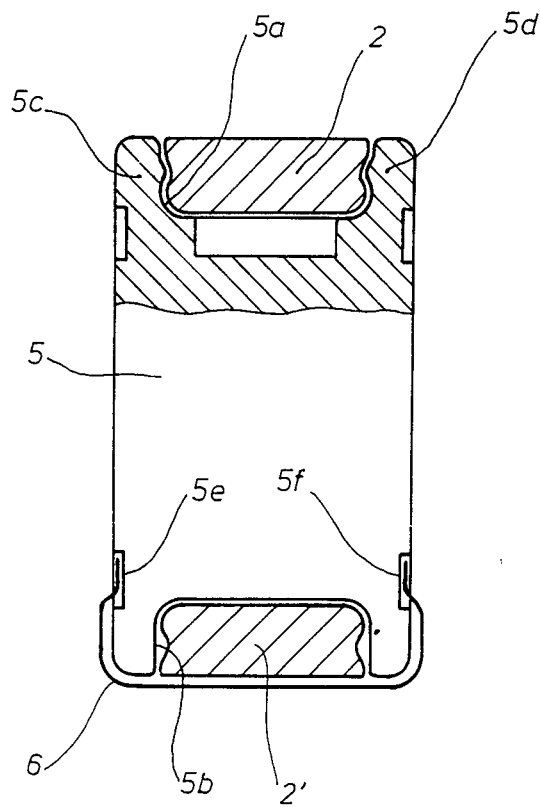
FIG. 5 shows a section along the line V—V in FIG. 1.

Separators 5 can be arranged in the usual way between the cross-pieces 2, 2' in order to keep the individual energy-conducting leads in their relative position. FIG. 5 shows a section through such a separator, from which the connection to the cross-pieces 2, 2' can be seen.

The separator 5 is provided with an upper and a lower recess 5a, 5b which serve to receive the cross-pieces 2, 2' respectively. The upper recess 5a is profiled so that a releasable form-locking snap connector is produced between the cross-piece 2 and the separator 5. For this purpose the side walls 5c, 5d which define the recess 5a are provided with an undercut behind which the cross-piece 2 engages in the assembled state.

The lower recess 5b on the other hand is provided with smooth vertically extending side walls. The cross-piece 2' can be loosely inserted into this recess 5b so that when the cross-piece 2 is released from the side plates in the manner already described the separators 5 are also removed at the same time with upper cross-piece 2.

An alternative indicated in FIG. 5 consists of retaining the cross-piece 2' in the recess 5b by means of a sprung-on spring clip 6. Such additional securing of the connection between the cross-piece 2' and the separators 5 can be advantageous above all in the case of high strains on the energy-conducting chain (e.g. in the case of large cables).

Furthermore, there is also the possibility of connecting the upper cross-piece to the separators by means of a spring clip 6 in addition to the form-locking connection already described. The cross-pieces 2, 2' can be produced either from plastics material or from metal, preferably aluminium.

FIGS. 6 and 7 show embodiments of a possible covering of the upper and lower broad sides of the energy-conducting chain.

In the variant according to FIG. 6 cover elements 7, 7' which close off the interior of the energy-conducting chain towards the exterior and are releasable together with the cross-pieces are connected to each of the individual cross-pieces 2, 2'. The cover elements 7, 7' can be releasably connected to the cross-pieces 2, 2' for example by screwing, riveting or by a press fastener-like connection.

The cover elements 7c each consist of an essentially flat part 7a, two parts 7b and 7c which are curved like an arc of a circle and an inclined connecting piece 7d. The centre of curvature coincides with the joint axis 8 of the chain links. The curved parts 7b and 7c cover adjacent cover elements 7 in the manner shown in FIG. 6 so that on the one hand a pivoting movement of the chain links (between an extended position and a maximum curved position) is possible and in all relative positions the interior of the chain is covered towards the exterior.

The cover elements 7 are advantageously provided with openings through which a screwdriver which serves to release the cross-pieces 2 can be inserted, as has already been explained with the aid of FIGS. 1 to 4. The cross-pieces 2 can then if desired be released together with the cover elements 7 which are connected to them. However, constructions are of course also possible within the scope of the invention in which the cover elements 7 can be separately removed from the cross-pieces.

In the embodiment according to FIG. 6 an upper and a lower cross-piece 2, 2' is connected to each link of the side plate chain.

By contrast, FIG. 7 shows a construction in which the cross-pieces 2, 2' are only connected to every second link of the two side plate chains.

In this embodiment retaining pieces 9, 9' which serve to receive an upper and lower cover strip 10, 10' are provided on the chain links which are not equipped with cross-pieces 2, 2'. The retaining pieces 9, 9' can be provided in the same recesses in the side plates 1 which in the chain links equipped with cross-pieces serve to receive the cross-pieces 2, 2'.

The two side plates advantageously have a smooth outer contour so that the chain can also run on one side surface if desired.

I claim:

1. An energy conducting chain comprising:
   first and second spaced side plate chains, each of said chains comprising a plurality of pairs of side plates pivotally connected in series and substantially parallel to each other said side plates including upper, lower, inside, and outside surfaces, at least some of the side plates of said first and second chains defining recesses in said upper and lower surfaces;
   pairs of cross-piece members extending laterally between said first and second side plate chains at intervals along the lengths of said side plate chains;
   locking member integrally formed at opposite ends of each of said cross-piece members and each locking member including an extension for mating with the recess of a side plate of said side plate chains,
   a spring biased stop tongue attached to opposite ends of said cross-piece members and located inwardly of said locking members, each stop tongue including a free end with a stop projection thereon, said stop tongues being spring biased in direction parallel to the longitudinall extent of its respective cross-piece member;
   each of said side plates including, on the inside surface thereof, an inclined guide surface which terminates in a stop surface adapted to be engaged by said stop projection and form with said stop tongue a releasable snap connection between said cross-piece member and said side plate chain;
   and an opening formed in each end of said cross-piece members, each opening in registration with said spring biased stop tongue, said opening oriented to permit an elongated tool to be inserted longitudinally into said opening and urged against said spring biased stop tongue and move said stop projection out of engagement with said stop surface.

2. Energy-conducting chain as claimed in claim 1 and wherein said stop tongues each include a guide projection located above said stop projection and adjacent the free end thereof, each of said stop tongues have a width (B), and each of said guide projections (2g) extends over only a part of said width (B) of stop tongue (2d), and wherein said inclined guide surface (1e) of said side plate has a groove (1g) for to receiving said guide projection.

3. Energy-conducting chain as claimed in claim 1 and wherein said stop tongue (2d) have a free length which is greater than a free length of said extensions (2b).

4. Energy-conducting chain as claimed in claim 3 and wherein said free length of said stop tongues (2d) is only slightly less than half of the distance between two individual cross-pieces (2, 2') which together comprise one of said pairs of cross-pieces.

5. Energy-conducting chain as claimed in claim 1 and further including means (1c, 2c) for securing said extension (2b) of said cross-piece (2) to said side plate (1) with a threaded member.

6. Energy-conducting chain as claimed in claim 1 and further comprising cover elements (7, 7') releasibly attached to said cross-pieces (2, 2'), which cover elements close off the interior of said energy-conducting chain.

7. Energy-conducting chain as claimed in claim 1 and wherein each said side plate is attached to said cross-pieces.

8. Energy-conducting chain as claimed in claim 1 and wherein successive links of said side plate chains are provided alternately with cross-pieces (2, 2') and with retaining pieces (9, 9') which extend between said side plates and are adapted to be received in said recesses, and are adapted to receive a cover strip (10, 10').

9. Energy-conducting chain as claimed in claim 1 and further comprising separators (5) arranged between said cross-pieces (2, 2'), and which are connected to said cross-piece (2') by a releasable clip (6) and to another said cross-piece (2) by a releasable form-locking snap connection.

10. Energy-conducting chain as claimed in claim 1 and wherein said two side plate chains have a smooth outer contour.

11. The energy-conducting chain of claim 1 and wherein said cross-piece members (2) and said side plates (1) include tongue and groove guides (1e, 2g) which register as the stop projections (2f) engage said stop surface (1f).

* * * * *